United States Patent Office
3,132,528
Patented May 12, 1964

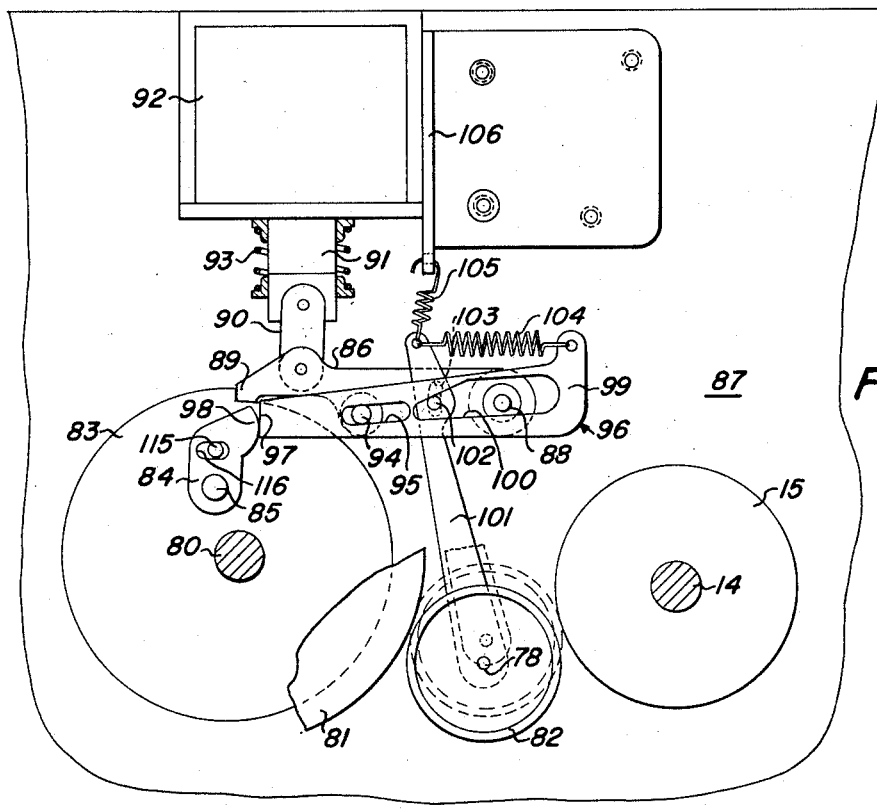

3,132,528
INTERMITTENT DRIVE CONTROL DEVICE
Bruce L. Elle, Donald P. Reinhardt, and Anthony P. Di Fulvio, Rochester, N.Y., assignors to Eastman Kodak Company, Rochester, N.Y., a corporation of New Jersey
Filed Aug. 15, 1960, Ser. No. 49,592
3 Claims. (Cl. 74—125)

The invention relates to an intermittent drive and more particularly to a device for controlling movement of an element which is movable selectively and intermittently in at least two different increments.

Intermittent drives of the ratchet type are well known and are usually designed to provide a specific amount of movement of an element with each actuation of the pawl or to serve merely as a means for periodically or aperiodically arresting motion of the element. Such devices do not readily lend themselves to extremely accurate control of the element so the movement thereof can be held within very exacting limits. On the other hand, the device disclosed herein provides for intermittent movement of an element in very small and equal increments, which must be accurately maintained, as well as in any one of several different increments, such increments of advance being selectable and accurately controlled.

The intermittent drive and control device which is described hereinafter, can be utilized, for example, to advance a tape or strip of material in increments of the order of .015 of an inch within very exacting tolerances. Such a device can be utilized to advance a film strip in a camera for photographically recording digital data and/or documents in which one increment of movement is required for recording the data and another increment of movement is required for recording the documents. A camera of this type is disclosed in U.S. Patent 2,881,658.

In the device about to be described in detail, the element to be moved intermittently is operatively connected to a shaft which carries two ratchets and is frictionally coupled to a drive means. A single pawl engages one of the ratchets to hold the shaft against rotation and a pair of pawls are arranged to alternately engage the other ratchet to hold the shaft against rotation. The single pawl is moved between an operative and an inoperative position by means of a solenoid and when this pawl is utilized to control movement of the shaft, the pair of pawls are retained in an inoperative position. Likewise, when the movement of the shaft is to be controlled by the pair of pawls, the first pawl is held in its inoperative position. The pair of pawls is actuated by a cam having two axially spaced lobes, each lobe being associated with one of the pawls and being arranged to alternately actuate its respective pawl into and out of engagement with the ratchet. The cam is carried by a shaft arranged between the drive means and the first-mentioned shaft, this latter shaft being rotated by a drive member which is movable into a driving position between the latter shaft and the drive means so as to impart rotation to said shaft. The drive member is carried by a linkage which serves to simultaneously release the latter shaft for movement and to move the drive member into its driving position. By a cycling means which controls the actuation of the pawls as well as the selection of the operative pawl or pawls, the rotation of the first shaft and intermittent movement of the element is controlled. Since the pair of pawls alternately engage the ratchet, the movement of the element is, of course, limited by the movement of the pawls, or in other words, movement occurs only during the interval the pawls are interchanged in their relationship to the ratchet. In addition, it will be evident from the description which follows that the speed of operation factor is increased because it is easier to disengage one pawl and simultaneously drop another pawl into engagement with a ratchet than to disengage and reengage the same pawl.

The primary object of the invention is to provide an intermittent drive for an element in which one or more increments of movement can be selectively attained.

A further object of the invention is to provide an intermittent drive for an element in which a control device selectively determines the increment of movement of the element.

Another object of the invention is to provide an intermittent drive for an element in which two pawls alternately engage a ratchet to permit movement of the element only during the interval said pawls interchange positions.

A still further object of the invention is to provide an intermittent drive for an element in which movement of the element is controlled by two or more ratchets rotatable as a unit, each of which provides a different increment of movement and which are selectively operable.

And yet another object of the invention is to provide an intermittent drive for an element in which the movement of the element is controlled by two or more ratchets rotatable as a unit, each of which provides a different increment of movement and cooperates with its respective control means, only one of said control means being selectively operable at any time to determine the movement of said element.

These and other objects and advantages will be apparent to those skilled in the art by the description which follows.

Reference is now made to the accompanying drawings wherein like reference numerals and characters designate like parts and wherein:

FIG. 4 is a partial detail side elevation of the mechanism shown in FIG. 3 showing particularly the relation of the ratchets and pawls;

FIG. 5 is a detail front elevation of the mechanism for actuating the pair of pawls when such pawls are utilized to control the intermittent movement;

FIG. 6 is a partial detail plan view of the mechanism shown in FIG. 5; and

FIG. 7 is a simplified wiring diagram of a cycling means for controlling the actuation of the pawls in accordance with the selection of the intermittent movement.

In the embodiment of the invention about to be described, a number of shafts are disclosed as being interconnected by belts and/or gears to obtain the desired speed ratios to accomplish the desired advancement of the tape or film F. However, it is to be understood, as explained hereinafter, that such shafts can be reduced in number by utilizing different drive ratios whereby the same result can be attained. In other words, the device can be operative with a minimum of three shafts. Further, in the description the element which is advanced intermittently is set forth as being a slide having a projection which engages the film perforation. Actually, the element can be a shaft, a gear on the shaft, a cam on the shaft or any other element which is to be moved intermittently to provide any one of two or more increments of movement which can be chosen selectively.

Figure 1:
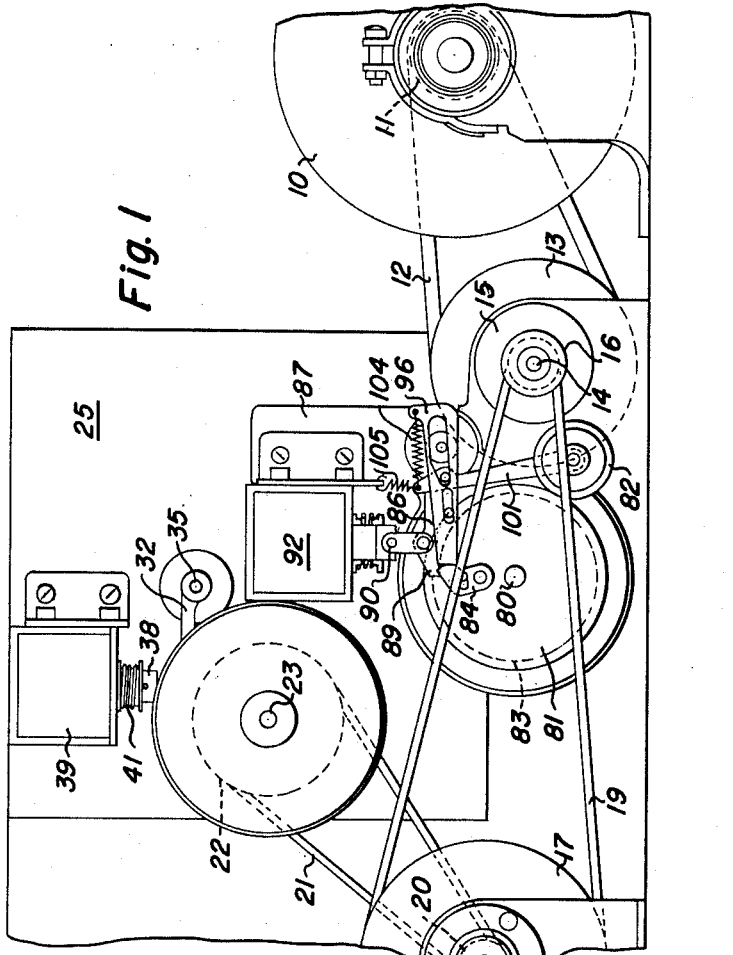
FIG. 1 is a front elevation of one embodiment of the invention showing the relation of the various elements and the arrangement by which the elements are interconnected to the drive means.
Figure 2:
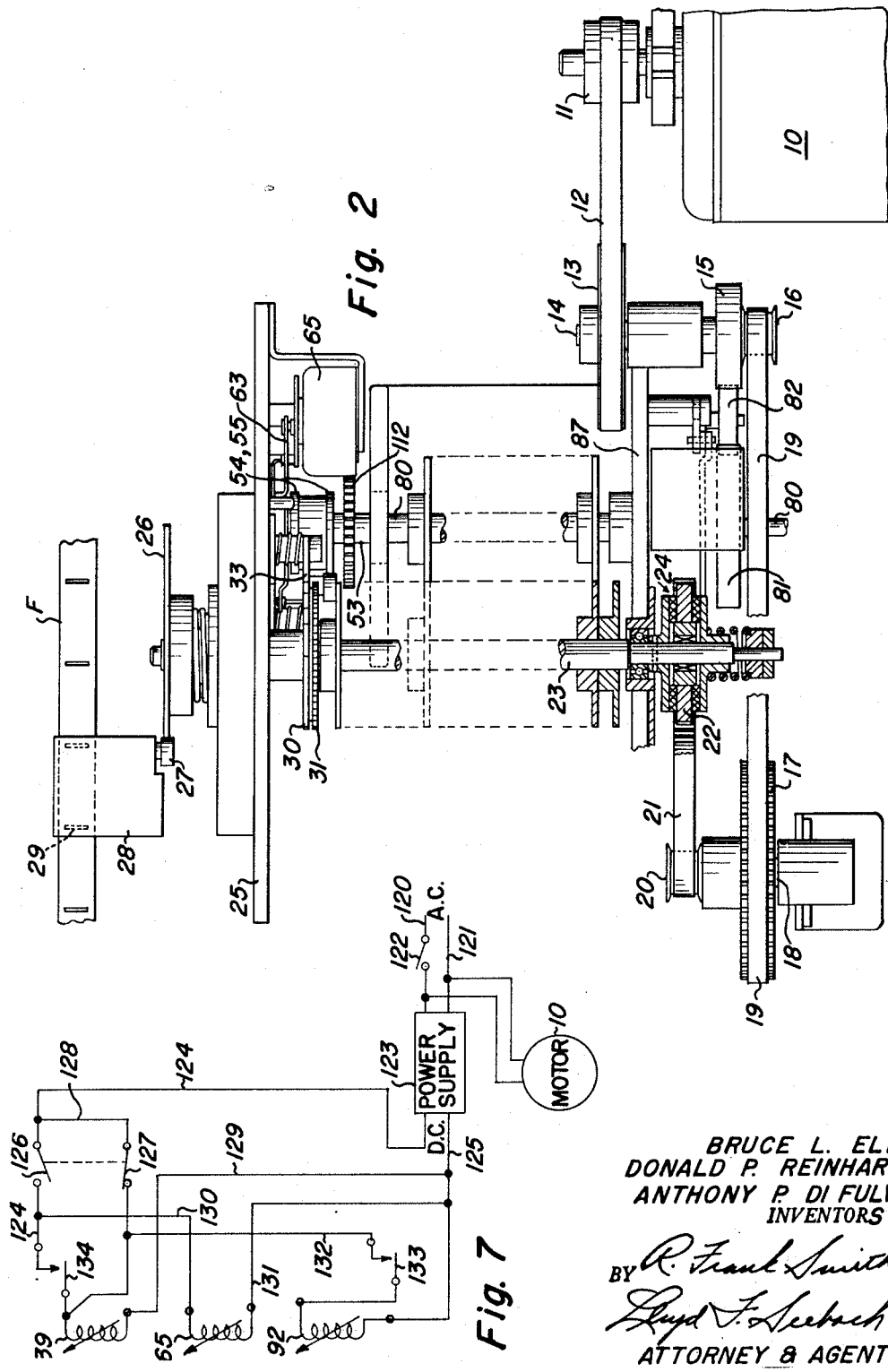
FIG. 2 is a plan view of FIG. 1 showing the invention as it may be utilized to intermittently advance a film strip.

With respect to FIGS. 1 and 2, the drive means comprises a motor 10 which by means of pulley 11, belt 12 and pulley 13 on shaft 14 serves to drive said shaft. Shaft 14 also carries a drive disc 15 and a pulley 16 which is connected to pulley 17 on idler shaft 18 by means of belt 19. Shaft 18 also carries a pulley 20 which is connected by belt 21 to pulley 22 on one end of shaft 23. As shown in FIG. 2, it will be noted that pulley 22 is freely rotatable on shaft 23 which is driven through the friction clutch 24, one part of which is secured to pulley 22 and the other part of which is fixed or keyed to shaft 23. In this way shaft 23 is frictionally coupled to the drive means for continuous rotation thereby except for the structure about to be described.

Figure 3:
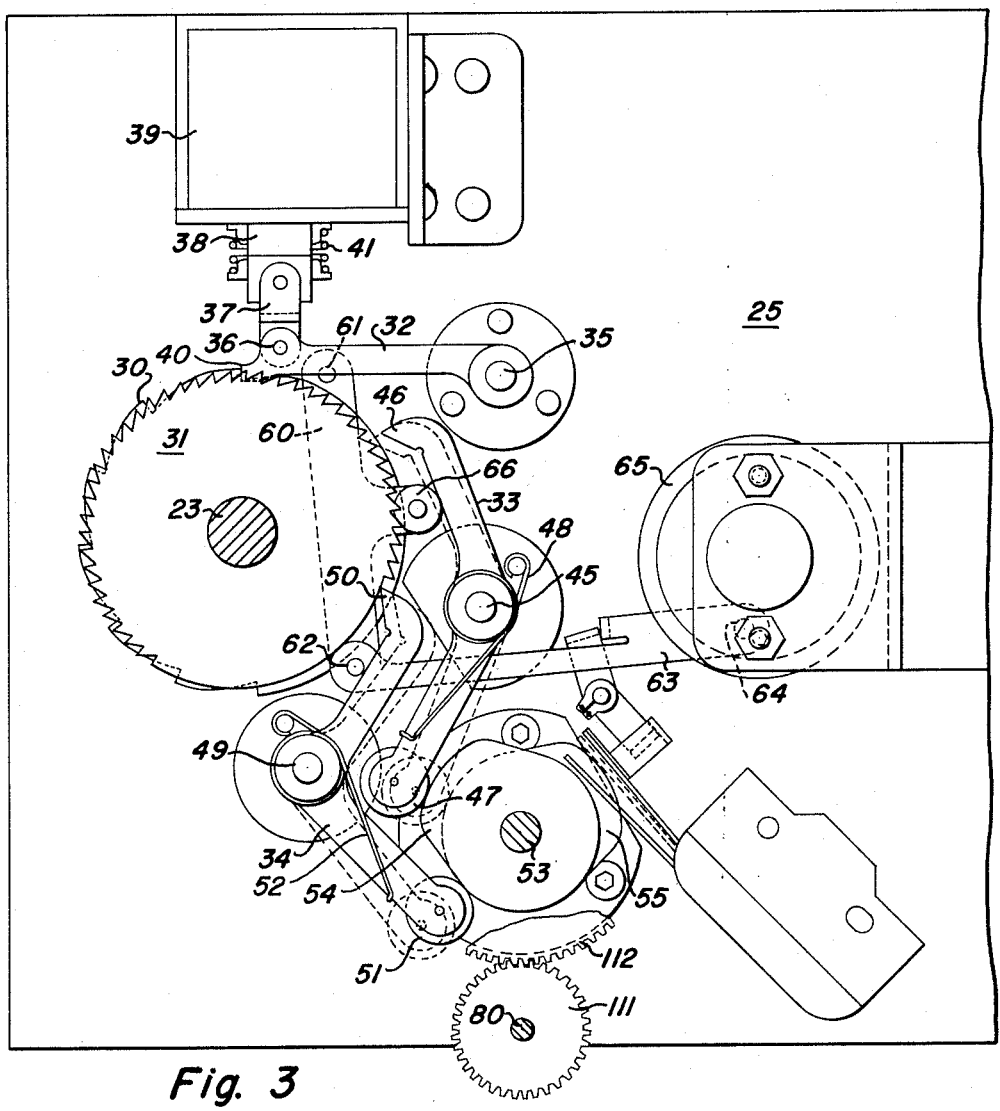
FIG. 3 is a detail front elevation of the pawl and ratchet assembly for controlling rotation of the shaft operatively connected to the element which is to be advanced intermittently.

The other end of shaft 23 is journaled in plate 25 and on the far side carries a cam 26 which is rotatable with said shaft. Follower 27 which is carried by slide 28 engages cam 26 so the rotary motion of cam 26 is converted to linear motion whereby the rectangular pin 29 carried by slide 28 and in engagement with a perforation in the film strip F causes the film to be moved to the left. Shaft 23 also carries two ratchets 30 and 31 which are rotatable as a unit with said shaft. The number of ratchets can be increased in accordance with the number of increments of movements desired. As shown in FIG. 3, it will be noted that the pitch of the teeth on ratchet 31 is smaller than the pitch of the teeth on ratchet 30. Ratchet 30 is engaged by pawl 32 and rachet 31 is engaged alternately by pawls 33 and 34, as described more fully hereinafter. Since ratchets 30 and 31 are secured or keyed to shaft 23 and engaged by pawls 32 or 33 and 34, shaft 23 can be held against rotation due to friction clutch 24.

Pawl 32 is pivotally mounted on plate 25 at 35 and adjacent its free end at 36 is connected by link 37 to armature 38 of solenoid 39, the nose 40 of pawl 32 normally engaging a tooth on ratchet 30 and being maintained in this position by spring 41 arranged with respect to armature 38, see FIG. 3. In this engaging position, pawl 32 holds ratchet 30 and shaft 23 against rotation. With energization of solenoid 39, nose 40 is raised to an inoperative position thereby permitting friction clutch 24 to rotate shaft 23. Disregarding pawls 33 and 34 for the moment, if solenoid 39 is energized only momentarily, nose 40 will release ratchet 30 and immediately return to its engaging position to intercept the next tooth on the ratchet. This movement is transmitted through cam 26 and follower 27 to slide 28 thereby advancing film strip F through an increment as determined by ratchet 30. On the other hand, if solenoid 39 is maintained in an energized state the shaft 23 will be free to rotate until solenoid 39 is deenergized and nose 40 engages a tooth on ratchet 30.

Pawl 33 is pivotally mounted on plate 25 at 45 and provided at one end with nose 46 and at the other end with a follower 47, said pawl being normally urged toward ratchet 31 by spring 48. Likewise, pawl 34 is pivotally mounted on plate 25 at 49 and provided with nose 50 and follower 51, pawl 34 being normally urged toward ratchet 31 by spring 52.

As shown in FIG. 3, pawls 33 and 34 are arranged between shaft 23 and shaft 53 which carries two axially spaced cams 54 and 55 for engaging followers 47 and 51 respectively, said cams being formed as a single unit, as shown in FIG. 4. It will be noted that the lobes of cams 54 and 55 are arranged with respect to each other so pawls 33 and 34 alternately engage ratchet 31. The arrangement of pawls 33 and 34 is such that movement equivalent to only one-half the pitch of the teeth on ratchet 31 can occur as nose 46 of pawl 33 moves into engagement and nose 50 of pawl 34 moves out of engagement with ratchet 31. In this way the pitch of the teeth on ratchet 31 can be double that required for a single pawl and an increase in accuracy of operation is thereby obtained.

When pawl 32 is operative, pawls 33 and 34 must, of course, be moved to an inoperative position. This is accomplished by link 60 which is pivotally mounted on plate 25 at 61 and has its free end pivotally connected at 62 to one end of link 63. The other end of link 63 is pivotally connected at 64 to the armature of rotary solenoid 65. When solenoid 65 is energized, the armature moves in a counterclockwise direction, as viewed in FIG. 3, thereby moving link 63 and link 60 to the right. With this movement of link 60, roller 66 and the pin at 62 engage pawls 33 and 34, respectively, to move them into an inoperative position in which they are maintained so long as solenoid 65 is energized. When solenoid 65 is de-energized, the spring associated therewith, which returns the armature to its initial position, also causes links 60 and 63 to be returned to the nonholding position.

Shaft 80, which is arranged between shaft 14 (drive means) and shaft 23, carries a drive disc 81 which is coplanar with disc 15 on shaft 14. A rubber-covered drive member or roller 82 is arranged to be moved from an inoperative position into a drive position in which said roller engages both of discs 15 and 81 thereby imparting rotation to shaft 80 from shaft 14. Shaft 80 also carries a single tooth ratchet or stop plate 83, see FIG. 5, and a member 84 pivotally mounted at 85 thereon. Pawl 86 is pivotally mounted on plate 87 by stud 88 and has a nose 89 which normally engages the single tooth on ratchet 83 to hold shaft 80 against rotation. Adjacent nose 89, pawl 86 is connected by link 90 to armature 91 of solenoid 92, the armature being urged downwardly, as viewed in FIG. 5, by spring 93. Pawl 86 carries a stud 94 which projects through slot 95 in link 96, said stud retaining link 96 in spaced and pivotal relation on pawl 86. The end 97 of link 96 engages nose 98 on member 84 and the other end 99 is provided with a slot 100 of the shape best shown in FIG. 5. Stud 88 extends through slot 100 and in cooperation therewith serves to maintain link 96 in a plane parallel to that of pawl 86. As shown in FIG. 5, lever 101 carries roller 82 at one end thereof, the roller being freely rotatable on stud 78. Lever 101 is arranged between pawl 86 and link 96 and adjacent the other end carries a pin 102 which extends through slot 100 in link 96 and slot 103 in pawl 86. The end of lever 101 is connected by spring 104 to the end of link 96 and by spring 105 to the bracket 106 on which solenoid 92 is mounted. Spring 104 tends to urge roller 82 against disc 81 and pawl 96 toward member 84 whereas spring 105 tends to urge lever 101 and, hence, roller 82 in an upward direction and into a driving position in which roller 82 engages disc 81 and disc 15.

Normally and before any selection of the increment of movement of slide 28 has been made and assuming motor 10 is energized, the various parts will be in the positions shown in FIGS. 3 and 5, with shafts 14 and 18 rotating continuously and shafts 23 and 80 being held against rotation by pawls 32, 34, and 86. If slide 28 is to be moved in increments (coarse) as determined by ratchet 30, solenoid 65 is energized and so long as it is maintained energized pawls 33 and 34 are held in an inoperative position by means of links 60 and 63. With pawls 33 and 34 in this inoperative position, rotation of shaft 23 and the movement of slide 28 are controlled by ratchet 30 and pawl 32. Periodic or aperiodic energization of solenoid 39 causes pawl 32 to be moved in a clockwise direction to release ratchet 30 and permit rotation of shaft 23 and movement of slide 28 through cam 26 and follower 27. As described above, the pitch of the teeth on ratchet 30, and the period of energization of solenoid 39 will determine the angular movement of shaft 23. Obviously, the movement of shaft 23 can therefore be varied from that of a single tooth to continuous movement or rotation.

When the movement of slide 28 is to be in increments (fine) as determined by ratchet 31, assuming the parts are in the positions as shown in FIGS. 3 and 5, solenoid 39 is energized and held energized thereby moving and holding pawl 32 in an inoperative position, the movement of shaft 23 and of slide 28 now being controlled by ratchet 31 and pawls 33 and 34. With energization of solenoid 92, pawl 86 is moved in a clockwise direction about stud 88 and because pawl 86 is connected to link 96 by pin 94 and slot 95, link 96 is moved with pawl 86 thereby releasing the end 97 from nose 98 of member 84 to release disc 83. As end 97 clears nose 98, spring 104 causes link 96 to move to the left and pin 102 enters the wide portion of slot 100. When pin 102 is in this area of slot 100, it is then free to be moved vertically upward in both of slots 100 and 103 by means of spring 105, thereby moving lever 101 and roller 82 so said roller is brought into driving contact with discs 14 and 81 to impart rotation to shaft 80. From the description it should be evident that the linkage fully releases pawl 86 and link 96 before roller 82 is moved into its driving position, the upward movement of lever 101 being retarded by the converging portion of slot 100 in engagement with pin 102. Solenoid 92 is energized only momentarily and upon de-energization pawl 86 and link 96 are returned by spring 93. However, since shaft 80 has started to rotate, pawl 86 rides on the periphery of disc 83 and link 96 is held in the position to the left by spring 104 with pin 102 engaging the upper righthand end of slot 103. Due to spring 105 holding lever 101 and roller 82 in the upper position in which roller 82 is held in driving contact with discs 14 and 81, link 96 is pivoted about pin 102 so the end 97 is in the path of nose 98 on member 84. With rotation of shaft 80, cams 54 and 55 are rotated thereby. To accomplish the desired alternate operation of pawls 33 and 34, shaft 53 which carries cams 54 and 55 can be driven from shaft 80 through a gear drive 111 and 112, or any other suitable drive, which will rotate shaft 53 at half the speed of shaft 80. If cams 54 and 55 were carried by shaft 80, then cams 54 and 55 will be of another shape whereby the same result can be attained with a single revolution of shaft 80 and cams 54 and 55. As cams 54 and 55 rotate through 180 degrees, cam 54 will allow the nose 46 of pawl 33 to move into engagement with ratchet 31 and cam 55 will move the nose 50 of pawl 34 out of engagement with ratchet 31. From FIG. 3, it will be noted that cams 54 and 55 are arranged so engagement of ratchet 31 by a pawl occurs before release of the ratchet by the other pawl, note dotted line positions. In other words, due to the pitch of the ratchet teeth, which is twice the desired increment of movement, at a particular instant both pawls are in engagement with ratchet 31, the one holding the ratchet and about to be released and the other in contact with the ratchet midway between two teeth. When the holding pawl is actually released, the other pawl permits shaft 23 to rotate through an angle equivalent to half the pitch of a tooth on a ratchet 31. It is by this arrangement that the small increments of movement of shaft 23 can be very accurately controlled and the reason for making the pitch of the teeth on ratchet 31 twice the desired increment of movement.

As shaft 80 nears completion of a single revolution, nose 98 of member 84 first contacts end 97 of link 96. With further movement of ratchet 83, member 84 pivots about 85 until pin 115 on ratchet 83 engages the righthand end of slot 116 in member 84. When this point is reached, further movement of ratchet 83 causes member 84 to move link 96 to the right. Since nose 89 of pawl 86 is riding on the low portion of the periphery of disc 83 to engage the single step, lever 101 is held in the drive position with roller 82 still driving by spring 105. However, the movement of link 96 to the right causes the diverging side of slot 100 to cam lever 101 downwardly and at the same time spring 104 tends to rock lever 101 in a clockwise direction so roller 82 is disengaged from disc 15.

As the break in the driving connection occurs, nose 89 engages the step in disc 83 to arrest movement of shaft 80. At this point, pawl 33 will be holding ratchet 31 and shaft 23 against rotation. With energization of solenoid 92, the same procedure is repeated and upon completion of another revolution of disc 83, pawls 33 and 34 will again be in the positions shown in FIG. 3. The operation can be manual or automatic and if accomplished manually, then solenoids 39, 65 and 92 would be energized as required. If operation is to be accomplished automatically then solenoids 39, 65 and 92 can be connected as shown in FIG. 7. In either case, the increment of advance can be selected and/or switched from one ratchet to the other at any time. In the embodiment disclosed, the pitch of the teeth on ratchet 30 is a multiple of the pitch on ratchet 31. In this case, when switching from the smaller increment to the larger, the condition can arise where movement of shaft 23 will occur as the switch is made due to the multiple pitch of ratchet 30. For example, if the pitch of the teeth of ratchet 30 is five times that of the teeth of ratchet 31, then if the switch is made at a time when nose 40 of pawl 32 would fall between any two successive teeth on pawl 30, shaft 23 would, upon release of pawls 33 and 34, be free to rotate until the first tooth is engaged by nose 40. This could, of course, be eliminated by making ratchets 30 and 31 exactly the same and controlling the energization of solenoid 39 to obtain the desired larger increment of movement.

The cycling means comprises the solenoids 39, 65, and 92 and the switches and circuitry associated therewith to provide a control for actuating slide 28 in accordance with the selected pawl mechanism. As shown in FIG. 7, motor 10 is connected across lines 120 and 121, line 120 having a switch 122 which when closed completes the circuit through motor 10 to energize it continuously and also supplies an A.C. potential to a power supply 123 which converts the A.C. to a D.C. potential on lines 124 and 125. Switch 126 in line 124 and switch 127 in line 128 are interlocked so upon actuation of one the other is also actuated. In the arrangement shown in FIG. 7, solenoid 39 is connected across lines 124 and 125 by line 128, switch 127 and line 129 and maintained in an energized condition so long as switch 127 is closed. So long as switch 126 is open, closing of switch 134 has no effect on solenoid 39. Solenoid 65 is connected to line 124 by line 130 and to line 125 by line 131 but since switch 126 is open, it cannot be energized. Solenoid 92 is connected by line 132 and normally open switch 133 to line 128 and to line 125. With either manual or cam actuation of switch 133 to a closed position, solenoid 92 is energized to release disc 83 and to cause movement of roller 82 into its driving position thereby resulting in slide 28 being moved and controlled in accordance with ratchet 31 and pawls 33 and 34, as described in detail hereinabove.

When switches 126 and 127 are actuated to their other position, that is, switch 127 is open and swicth 126 is closed, then solenoid 65 is maintained in an energized state via line 124, switch 126, line 130, line 131 and line 125 and pawls 33 and 34 are then held in their inoperative position by roller 66 and pin 62 on link 60. Since switch 127 is open, solenoid 92 cannot be energized even though switch 133 may be closed. Solenoid 39 is connected through line 124, switch 126, switch 134 and line 129 to line 125. With either manual or cam actuation of switch 134 to a closed position, solenoid 39 is energized to release pawl 32 thereby resulting in slide 28 being moved and controlled in accordance with ratchet 30 and pawl 32. As pointed out above, when slide 28 is controlled by ratchet 30 and pawl 32, actuation of switch 133 has no effect and switch 134 is not effective when slide 28 is controlled by ratchet 31 and pawls 33 and 34. Switches 133 and 134 can therefore be operated by cams rotated in proper synchronism with shaft 14 or shaft 23 to provide a fully automatic control with selection being accomplished by actuation of only the interlocked switches 126 and 127.

From the above description, it is evident the arrangement can be such that pulley 22 on shaft 23 can be connected to pulley 16 on shaft 14, thereby eliminating the need for shaft 18, pulley 17, pulley 20 and belt 21. Also by arrangement of a proper drive from shaft 14, the control mechanism for pawls 33 and 34 can be arranged on either side of shaft 23 and is not necessarily limited to being between or intermediate shafts 14 and 23. Many other modifications of the described embodiment of the invention will be apparent to those skilled in the art and the invention is therefore not to be limited to the disclosure but is of a scope as defined by the appended claims.

Having now particularly described our invention, what we desire to secure by Letters Patent of the United States and what we claim is:

1. A device for controlling movement of an element movable selectively and intermittently in at least two different increments comprising drive means, a first rotatable member operatively connected to said element and including means for frictionally coupling said rotatable member to said drive means, a first ratchet for providing one increment of movement, a second ratchet for providing another increment of movement, said ratchets being carried by said first rotatable member as a unit, a second rotatable member adjacent said first rotatable member, a pawl arranged with respect to said first ratchet and movable between a normal position in which it engages said first ratchet to hold said first rotatable member against rotation and an inoperative position, a pair of pawls arranged between said first and second rotatable members for alternately engaging said second ratchet to hold said first rotatable member against rotation, means carried by said second rotatable member for actuating said pair of pawls, a drive member arranged with respect to said drive means and said second rotatable member and movable into a driving position for imparting rotation to said second rotatable member, cycling means including a first control member, a second control member and a third control member, said control members being adapted to be actuated for initiating a cycle of operation, means responsive to actuation of said first control member and operatively connected to said pair of pawls for moving both pawls to an inoperative position, when intermittent movement of said element is to be controlled by said pawl, means responsive to actuation of said second control member and operatively connected to said pawl for actuating said pawl to its inoperative position to permit rotation of said first rotatable member and movement of said element, when said pair of pawls are in their inoperative position, and for holding said pawl in its inoperative position, when said pair of pawls control movement of said element, means responsive to actuation of said third control member and operatively connected to said drive member, when said pair of pawls are operative, for moving said drive member into said driving position to rotate said second rotatable member for interchanging the positions of said pair of pawls whereby movement of said first rotatable member and of said element occurs only after movement of said pair of pawls, and means interconnecting said control members for selectively actuating said control members to control the movement of said element by said first ratchet and by said second ratchet.

2. A device in accordance with claim 1 wherein the means for moving said drive member comprises a linkage including a member for holding said second rotatable member against rotation and a member for carrying said drive member, said linkage effecting simultaneous release of said second rotatable member and movement of said drive member into its driving position.

3. A device in accordance with claim 1 wherein the means for moving said drive member includes a linkage for effecting simultaneous release of said second rotatable member and movement of said driving member into its driving position and means carried by said second rotatable member for controlling the movement of said drive member to its inoperative position.

References Cited in the file of this patent

UNITED STATES PATENTS

| | | |
|---|---|---|
| 2,698,183 | Lang | Dec. 28, 1954 |
| 2,736,204 | Hill | Feb. 28, 1956 |
| 2,881,658 | Bornemann | Apr. 14, 1959 |
| 2,942,486 | Beguin | June 28, 1960 |